Aug. 27, 1929.  W. A. MORTON  1,726,114
METHOD AND APPARATUS FOR DRAWING SHEET GLASS
Filed Aug. 3, 1927
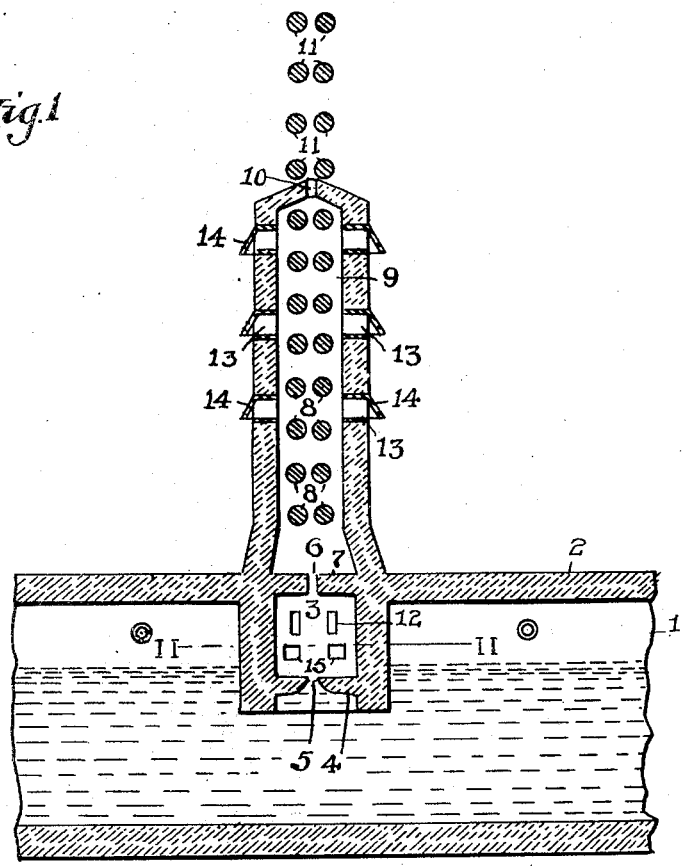
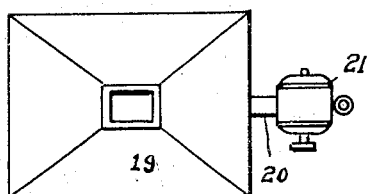
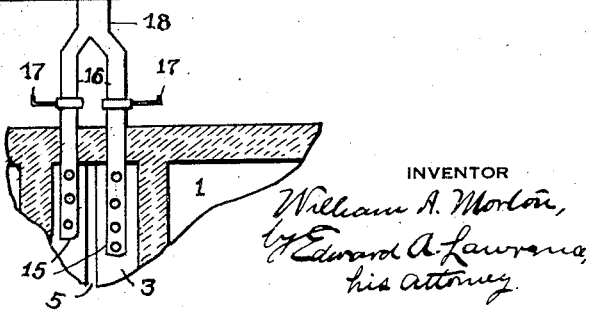
INVENTOR
William A. Morton,
by Edward A. Lawrence,
his attorney.

Patented Aug. 27, 1929.

1,726,114

UNITED STATES PATENT OFFICE.

WILLIAM A. MORTON, OF PITTSBURGH, PENNSYLVANIA.

METHOD AND APPARATUS FOR DRAWING SHEET GLASS.

Application filed August 3, 1927. Serial No. 210,313.

Glass is now commercially drawn as for instance by the Fourcalt method in sheet form directly from the furnace.

Sheet drawing is cheaper than the old method of blowing the glass in cylindrical form and splitting the cylinders into arcuate shawls which are then flattened.

Sheet drawing also substitutes the natural surface enamel for the artificially polished surface of rolled plate glass.

However, glass now drawn in flat sheet form is characterized by a waviness of surface so that the light rays are not properly transmitted but are refracted to a greater or less degree, thus rendering such glass objectionable and also unfitted for many uses. I attribute this defect to sheet drawn glass to atmospheric unstability in the zone through which the glass is drawn from the surface of the molten glass and from which the stretched and set glass passes to the guide rollers on its way to the annealing lehr.

Within this zone the more or less plastic glass is stretched to the desired thickness, and the glass must be sufficiently hardened and set before leaving this zone to prevent its subsequent deformation and the marring of its surface.

Necessarily the zones through which the sheet successively passes are in atmospheric communication and the heat given off by the cooling of the glass in the stretching and setting zone produces uncontrolled currents of lighter air which flow from this zone in the direction of the travel of the glass, and consequently currents of colder air are drawn into this zone, causing a certain turbulence in the atmospheric conditions in the stretching and setting zone which result in ununiform cooling of the glass. Therefore the glass does not stretch evenly and produces the wavy surfaces.

My invention is characterized by the elimination of the unstable atmospheric conditions in the stretching and setting zone. I accomplish this by maintaining in said zone a uniform atmospheric pressure greater than that of the colder air which would otherwise form the currents entering said zone.

I also maintain a uniform temperature in the stretching and setting zone, and the temperature is maintained at the proper degree to give the glass the necessary viscosity for proper stretching.

In the accompanying drawings wherein I have illustrated a new and improved apparatus for drawing sheet glass in accordance with my method, Fig. 1 is a broken vertical section of a glass furnace and its drawing outlet, and Fig. 2 is a plan view of the apparatus with the tank shown in section along the line II—II in Fig. 1.

Referring to the drawings, 1 represents the glass melting furnace shown as a continuous tank and having a top closure or roof 2. The stretching and setting zone is illustrated in the form of a chamber 3 supported by the roof structure of the furnace 1 and whose floor 4 is below the normal top level of the molten glass in the furnace. The floor 4 is provided with a slotted opening 5 disposed transversely of the furnace 1 and up through which opening the glass is caused to protrude by the hydrostatic head of glass in the furnace. As in the general practice the drawing bait, not shown, is lowered down into the zone 3 and the glass protruding through the slotted opening 5 adheres to the bait. The bait is then elevated up through a slotted aperture 6 in the roof 7 of the zone 3 and between the guide rollers 8 mounted in the upper chamber 9 and out through the top slot 10 of the chamber 9 and between the outer guide rollers 11 and the sheet is directed to the lehr.

12 represents water boshes which are provided in the zone 3 for preventing such high temperatures in said zone which would render the glass too viscous for proper setting in said zone.

The chamber 9 is usually provided with ports 13 in its side walls which ports are provided with adjustable closures 14.

The above described structure and apparatus are substantially those now used in the well known Fourcalt method of drawing glass.

It is apparent that the heat radiating from the surfaces of the glass in zone 3 will set up currents of lighter air which will flow out through the slot 6, leaving areas of relative low pressure in the zone 3. The result is that currents of colder and heavier air will flow inwardly through the slot 6 into the zone 3 and thus a condition of atmospheric turbulence will exict in said zone and prevent the uniform stretching and setting of the glass. To correct these faulty conditions I provide and maintain a constant atmospheric pressure in the zone 3 greater than that at the outer or upper side of the slot 6 so as to prevent entering currents of air, and I maintain a proper temperature in the zone to insure the necessary viscosity in the glass to permit its proper stretching.

Thus I may provide the perforated air bosh or boshes 15 which extend transversely within the zone 3 on either side of the slotted opening 5 and preferably adjacent to the floor 4 and which are connected at their outer ends to the branched pipe 16 provided with valves 17 and connected to the pressure pipe 18 which leads from a heater 19. The heater 19 may conveniently be a recuperator. The air inlet of the heater 19 is connected by the pipe 20 with a blower 21 for a supply of air under constant pressure.

By means of the air boshes and other connections for providing and maintaining a supply of air under suitable pressure I maintain in zone 3 wherein the glass is stretched to the desired thickness an air pressure sufficiently greater than atmospheric pressure to prevent the entrance of currents of cooler air inwardly through the slot 6, and I thus provide and maintain an atmospheric stability in said zone. Furthermore the temperature of the air in zone 3 is kept constant and at the proper degree, thus maintaining the glass at uniform and proper viscosity best suited for the stretching operation.

I am thus able to produce sheet glass of uniform thickness with flat surfaces of the natural enamel.

It is evident that if the atmospheric pressure in the zone 3 is greater than the convectional acting displacement pressure of an inwardly moving cold air current, such entering currents will be prevented and the glass sheet in said zone will be bathed by a uniformly heated air stream which will move towards and through the slot 6.

What I desire to claim is:—

1. The method of drawing glass upwardly in sheet form from a supply of molten glass which includes the operation of stretching and setting the glass in a zone wherein the atmospheric conditions are stabilized at a pressure above surrounding atmospheric pressure.

2. The method of drawing glass upwardly in sheet form from a supply of molten glass which includes the operation of stretching and setting the glass in a zone wherein an atmospheric pressure is maintained at a pressure above surrounding atmospheric pressure sufficient to prevent the entrance of currents of colder air.

3. The method of drawing glass in sheet form which includes the operation of drawing the glass upwardly from a supply of molten glass and stretching the glass in a zone wherein the atmospheric pressure is greater than the convectional acting displacement presure of inwardly moving colder air currents.

4. The method of drawing glass which includes the step of drawing the glass upwardly from a supply of molten glass and stretching the glass to the desired thickness in a zone wherein the sheet is surrounded by a stream of heated air moving in the direction of the travel of the sheet and at a pressure greater than the surrounding atmospheric pressure.

5. In apparatus for drawing glass in sheet form, the combination with the glass melting furnace and a stretching chamber superimposed on the furnace and communicating with the furnace through a slotted opening in the floor of the chamber, of means for maintaining in said chamber at atmospheric pressure sufficient to prevent the entrance of currents of colder air into said chamber.

6. In apparatus for drawing glass in sheet form, the combination with the glass melting furnace and a stretching chamber superimposed on the furnace and communicating with the furnace through a slotted opening in the floor of the chamber, of means for bathing the sheet of glass in a stream of heated air moving in the direction of the travel of the glass and at a pressure sufficient to prevent currents of colder air impinging on the surfaces of the sheet.

7. In apparatus for drawing glass in sheet form consisting of a glass melting furnace and a stretching chamber superimposed on the furnace, the combination of means for maintaining a heated air pressure greater than the atmosphere and sufficient to prevent the entrance of currents of cooler air and regulable cooling means for adjusting the sheet thickness within the chamber.

Signed at Pittsburgh, Pa., this first day of August, 1927.

WILLIAM A. MORTON.